(12) United States Patent
Ahuja et al.

(10) Patent No.: US 10,785,124 B2
(45) Date of Patent: Sep. 22, 2020

(54) NETWORK PLANNING WITH AVAILABILITY GUARANTEES

(71) Applicant: Facebook, Inc., Menlo Park, CA (US)

(72) Inventors: Satyajeet Singh Ahuja, Cupertino, CA (US); Yury Smirnov, Palo Alto, CA (US); Alexander Ilo Nikolaidis, Redwood City, CA (US); Gayathrinath Nagarajan, Sunnyvale, CA (US); Steve Politis, Arvada, CO (US); Srivatsan Balasubramanian, Hong Kong (HK)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/680,175

(22) Filed: Aug. 17, 2017

(65) Prior Publication Data

US 2019/0058638 A1 Feb. 21, 2019

(51) Int. Cl.
*H04L 12/24* (2006.01)
*H04L 12/721* (2013.01)
*H04L 12/26* (2006.01)

(52) U.S. Cl.
CPC ........ *H04L 41/145* (2013.01); *H04L 41/0668* (2013.01); *H04L 41/0896* (2013.01); *H04L 43/0811* (2013.01); *H04L 45/38* (2013.01); *H04L 43/16* (2013.01)

(58) Field of Classification Search
CPC ....... H04L 43/16; H04L 45/38; H04L 41/145; H04L 41/0668; H04L 43/0811
See application file for complete search history.

(56) References Cited

U.S. PATENT DOCUMENTS

| 8,612,284 | B1 * | 12/2013 | Sharif | G06F 3/067 |
| | | | | 705/400 |
| 10,275,331 | B1 * | 4/2019 | Gudka | H04L 41/0836 |
| 2004/0024865 | A1 * | 2/2004 | Huang | H04L 43/0811 |
| | | | | 709/224 |
| 2004/0153835 | A1 * | 8/2004 | Song | H04L 41/065 |
| | | | | 714/38.11 |
| 2005/0050377 | A1 * | 3/2005 | Chan | H04L 63/1433 |
| | | | | 714/4.3 |
| 2007/0058554 | A1 * | 3/2007 | Benlarbi | H04L 41/145 |
| | | | | 370/248 |

(Continued)

*Primary Examiner* — Asad M Nawaz
*Assistant Examiner* — Syed Ali
(74) *Attorney, Agent, or Firm* — FisherBroyles, LLP

(57) ABSTRACT

A system and method for network planning with certain guarantees is disclosed. The system receives data characterizing various aspects of a backbone network, such as the nodes of the backbone network, how the nodes are connected by network links, the maximum available capacities of the network assets, network costs, and network asset reliability information. The system also receives data characterizing the requirements of different data communications, or flows, within the backbone network. For example, the backbone network may need to provide a flow a minimum amount of bandwidth or throughput, and the flow may have a minimum required uptime or availability. Based on the network data and flow data, the system generates a network plan that describes how capacity should be provided by different components of the network in a manner that guarantees satisfying flow requirements while balancing other considerations, such as network costs.

18 Claims, 9 Drawing Sheets

(56) References Cited

U.S. PATENT DOCUMENTS

| | | | |
|---|---|---|---|
| 2009/0172168 A1* | 7/2009 | Sonoda | G06F 9/5061 709/226 |
| 2012/0284390 A1* | 11/2012 | Chokkalingam | G06F 9/5027 709/224 |
| 2013/0198274 A1* | 8/2013 | Papakipos | H04W 76/11 709/204 |
| 2014/0185432 A1* | 7/2014 | Liu | H04L 41/0668 370/228 |
| 2017/0085488 A1* | 3/2017 | Bhattacharya | H04L 41/0813 |
| 2018/0131565 A1* | 5/2018 | Williams | H04L 41/145 |

* cited by examiner

NETWORK PLANNING WITH AVAILABILITY GUARANTEES

BACKGROUND

Some entities, such as large corporations, government agencies, or universities, may maintain backbone networks to interconnect entity assets. For example, a corporate backbone network can be used to connect different data centers maintained by a corporation. Backbone networks can additionally include one or more points of presence for connecting the backbone network to the Internet. Backbone networks are themselves made up of connectivity devices, such as hubs, switches, and routers, as well as cables to connect the connectivity devices. These components of the backbone network provide the network capacity by which the data communication demands between assets (e.g., between data centers or computing devices) may be satisfied.

In order to effectively satisfy the data communication demands of a backbone network, network planners can guide the development of the network based on forecasted network needs. For example, a network planner can identify where more or less capacity is needed between assets in order to accommodate the anticipated demand between those assets. Due to the complexity of developing a network plan, and the dynamic changes to the conditions driving the network needs, network planners typically rely on computer-based tools for assistance.

Traditionally, however, these tools have had certain shortcomings. For example, the tools have not developed a network plan based on a comprehensive evaluation of the requirements of the data communications, or flows, over the backbone network. As a result, the developed plan can result in a backbone network that is over-designed (i.e., it provides unnecessary capacity) or under-designed (i.e., it cannot meet the requirements of the network flows).

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
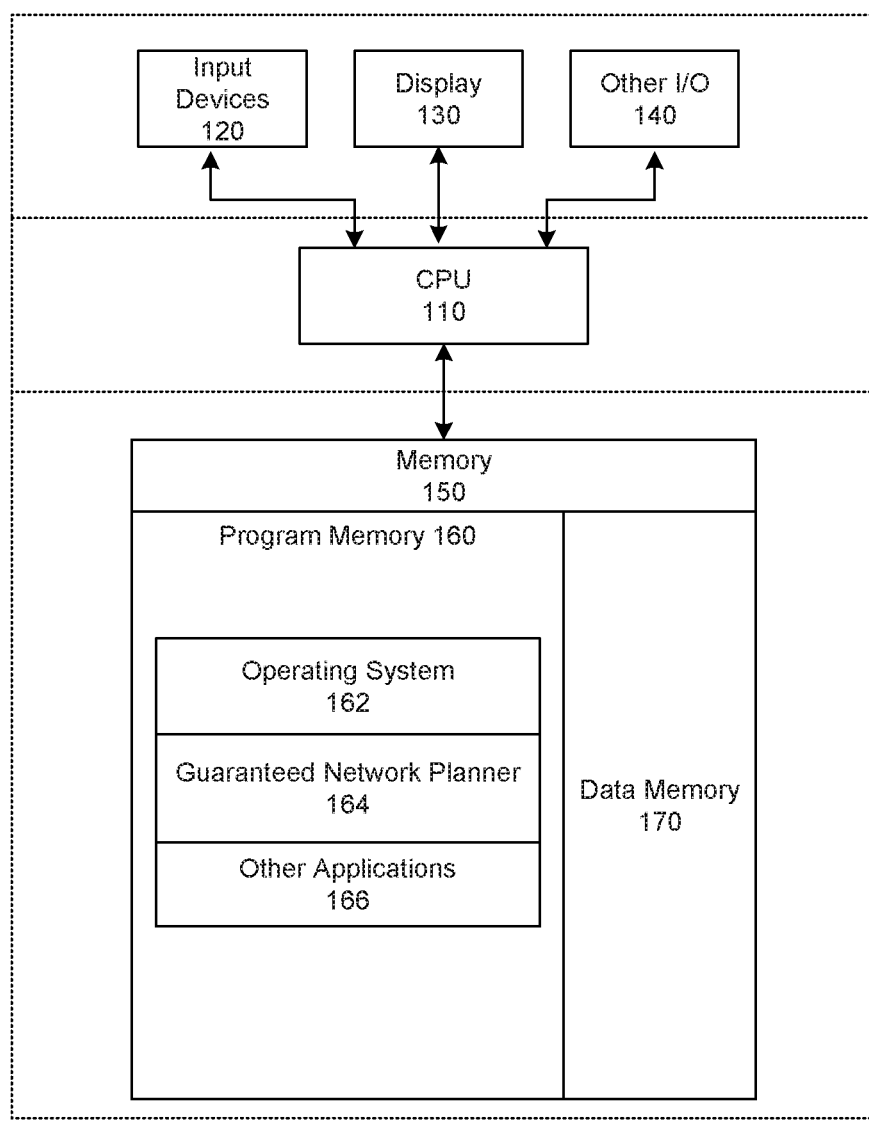
FIG. 1 is a block diagram illustrating an overview of devices on which some implementations can operate.

Embodiments for facilitating capacity planning of a backbone network are described herein. A network planning with guarantees system evaluates information regarding an existing or planned backbone network and generates a capacity provisioning plan (i.e., a "network plan") that satisfies requirements of the network. The network plan can indicate the amount of capacity that should be provided by different elements of the backbone network to satisfy various network requirements. As described herein, the data communications between assets of the backbone network, or flows, can have particular requirements that must be met to satisfy the needs of the communicating nodes. That is, a flow can have a minimum bandwidth or throughput that must be provided by the backbone network to satisfy the flow. As an additional example, a flow can have a maximum latency before which data from one asset must reach another asset. As a further example, a flow can be characterized by a required availability level (i.e., how often over time the flow is satisfied by the backbone network). By additionally utilizing information that characterizes the likelihood of failure of various components within the backbone network, the system is able to generate a network plan that effectively guarantees the required availability of the characterized flows. A network planner may then utilize the generated network plan to guide their further planning and development of the backbone network (e.g., where capacity should be added in the network).

The network planning with guarantees system evaluates information describing various aspects of a network. As described herein, the network information includes network component data characterizing the components that form the network. For example, the network component data can include a list of all the network nodes. A network "node," as used herein, refers to an asset interconnected by the network, an interconnection point within the network, or a network endpoint. For example, a node can represent a data center, a point of presence, or other computing device or interconnection point connected by a network.

The network information can additionally include network connectivity data. The connectivity data can describe, for example, the network links that directly connect one node to another in the backbone network. A network "link," as used herein, refers to a physical communication link that enables data communication routes, or flows, between sets of nodes in the backbone network. A link can be implemented, for example, as an optical fiber cable, copper-based cable, or other physical cable used in data networks. A link can also refer to a point-to-point wireless connection, such as through a satellite or other means. Each link may enable flows between multiple nodes (e.g., a link that carries data between node A and node B can be for flows between nodes A and B, as well as other flows that traverse the same link). The connectivity data can describe both bidirectional and unidirectional links between the nodes. That is, some network connections between network nodes can be capable of two-way communication, while other connections within the network may only support communication from one of the connected nodes to the other connected node. A link can be characterized, for example, by the maximum available capacity of the link (i.e., the maximum bandwidth or throughput that can be provided by the link, such as gigabits per second ("Gbps")), by the minimum capacity that must be provided by that link, and by the delay or latency from traversing the link. The network connectivity data can also characterize the reliability of the links in the backbone network.

Factors relating to the overall reliability of a link can additionally be included in the network connectivity data. For example, for each link, the network connectivity data can include information characterizing the expected time between failures for that link (e.g., the mean time between failures, or "MTBF"), the expected time to repair a failure (e.g., the mean time to repair, or "MTTR"), or an overall chance of a failure (e.g., the probability that any the link has failed at any given time). The reliability data for each link can be based on the observed performance of the link and similar links, based on the predicted or forecasted performance of the link, or a combination of the above. For example, the reliability data for a link may be initially derived from the observed performance (e.g., MTBF and MTTR) of similar links (e.g., underground, underwater, using the same physical cable materials, etc.). The reliability data for that link can then be updated over time based on observations of the link's actual performance.

The network information can additionally include network flow data describing the data communication flows within the backbone network. Each data flow represents a data communication between two assets in the backbone network. For example, one flow can represent a periodic data transfer between two data centers within the network, another data flow can represent continuous data communication between a network point of presence and a data center, etc. Each flow is characterized by two nodes (e.g., a source node and a destination node), and a "demand" (i.e., a required available throughput or bandwidth) between the two nodes. The two nodes may not be directly connected by a network link, and the flow between the two nodes therefore can travel over (i.e., be satisfied by) multiple links through one or more additional nodes of the network. The network flow data can characterize known network flows (i.e., currently observed in the backbone network) as well as projected or predicted flows.

Network flows can be additionally characterized by an availability requirement level. An availability requirement level, or class of service ("COS"), represents the required availability capacity within the backbone network to satisfy the flow. The availability requirement level can be based on the percentage during which a flow must be satisfied over a window of time (e.g., over a period of a month, over a period of 6 months, over a period of a year, etc.). For example, a first flow may have a requirement that it be satisfied by the backbone network 90% of the time over the course of a year ("one-nine" availability or COS), a second flow may have a requirement that it be satisfied by the backbone network 99% of the time over the course of a year ("two-nines" availability or COS), a third flow may have a requirement that it be satisfied by the backbone network 99.999% of the time over the course of a year ("five-nines" availability or COS), etc. As described herein, the network planning with guarantees system generates a network plan that satisfies each of the network flows at their corresponding required availability levels.

In some embodiments, the system uses the network information (e.g., connectivity data, flow data, reliability data, etc.) to generate a network plan by successively generating network models, based on increasing sets of failure scenarios, until one of the network models has been verified as satisfying network requirements and adhering to network limitations over a further set of scenarios. That is, the system selects a set of failure scenarios (i.e., single- and multi-link failures) for each class of service. Using a network modeler, which can model the backbone network as a multi-commodity max-flow formulation, the system generates a network model that satisfies network requirements (e.g., each flow has an acceptable unavailability) over the selected set of failures. The system then verifies the model over a larger set of failures simulating a threshold duration of time, and if the model is not verified, generates a new model based on an expanded set of failures until a model is generated that can be verified. As described herein, by performing a computationally expensive network model generation over a limited set of failures, and verifying the model over an exhaustive set of failures simulating an extensive period of time, where the limited set of failures is adjusted until a verified solution is obtained, the system is advantageously able to balance modeling effort and verification to generate a robust network plan that effectively guarantees the network can adequately service flows as required.

The disclosed system has several advantages. Although some of these advantages are described in this disclosure, not all advantages are required in each implementation of the network planning with guarantees system. Additionally, some advantages will become apparent to those having ordinary skill in the art after reviewing the disclosure. One advantage of the system is that it evaluates different aspects pertaining to the reliability of assets within a network, such as the mean time between failure for the asset and the mean time to repair the asset, to generate a network plan that efficiently meets availability requirements in spite of the network failures that can occur over time. As updated reliability information is obtained, or new failure scenarios are forecasted, the system is able to revise the network plan accordingly. In contrast, prior art systems that plan for conservative "worst-case" failure scenarios typically overdesign networks by recommending excess capacity beyond what is needed to meet flow availability requirements. Another advantage of the system is that it identifies particular sets of failure scenarios under which to model a backbone network, thus limiting the computational cost of modeling, while validating the network over a more exhaustive set of scenarios, thereby generating a solution that provides guaranteed availabilities. That is, the system is able to more accurately account for the requirements of flows within a network when generating a network plan, thereby increasing the ability of a network to meet its needs while improving the efficiency of the generated network plan. It will be appreciated that other efficiencies and advantages can be realized by network planners based on the use of the network planning with guarantees system.

Suitable Environments

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that performs guaranteed network planning. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, guaranteed network planner 164, and other application programs 166. Memory 150 can also include data memory 170 that can include (1) network information such as network component data, network connectivity data, network flow data, or reliability data, (2) generated network models undergoing further verification, (3) generated plans and reports that characterize the plans, (4) configuration data, (5) settings, (6) user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
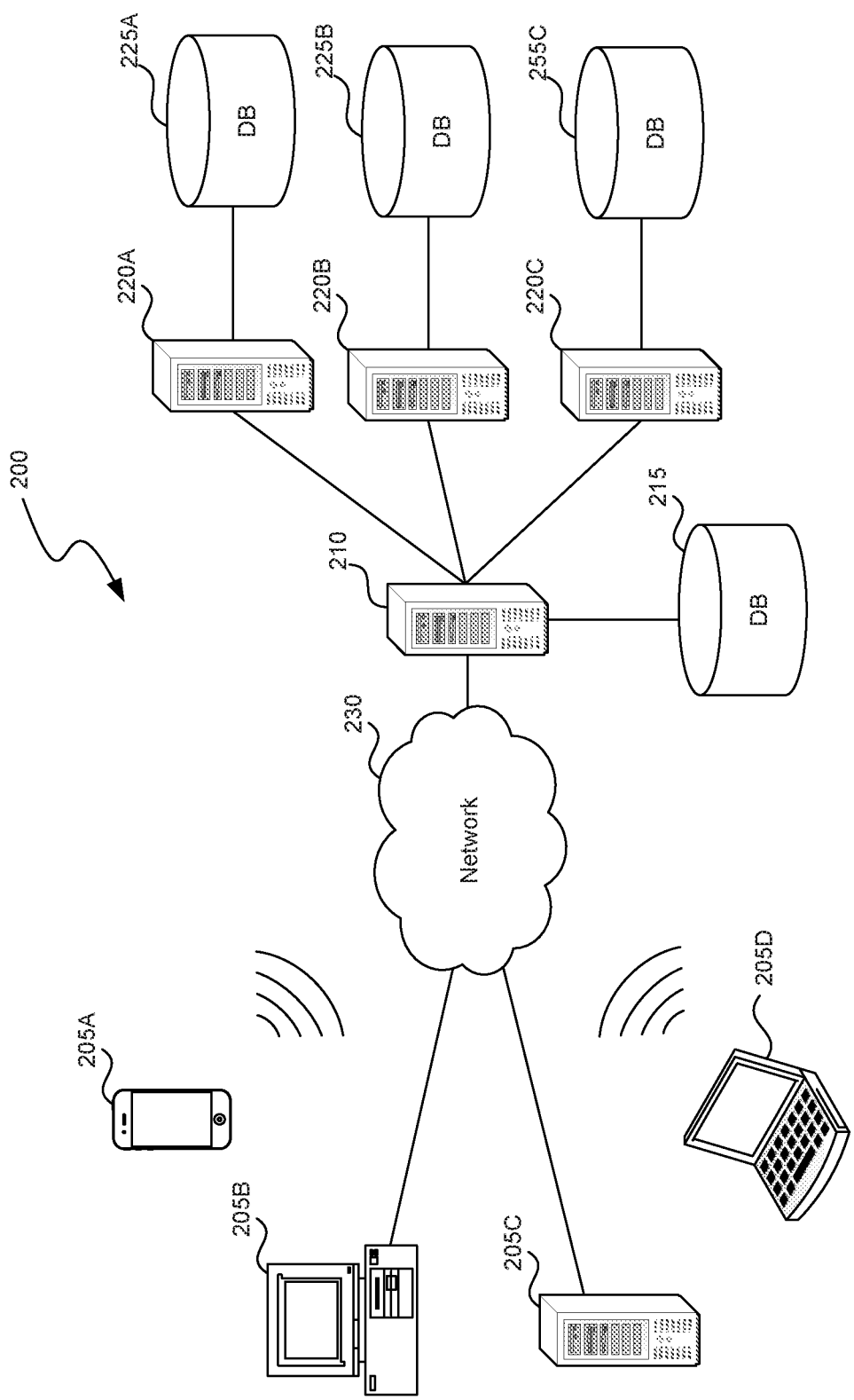
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as network component data, network connectivity data, network flow data, network reliability data, generated network models, and other generated reports. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 can be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
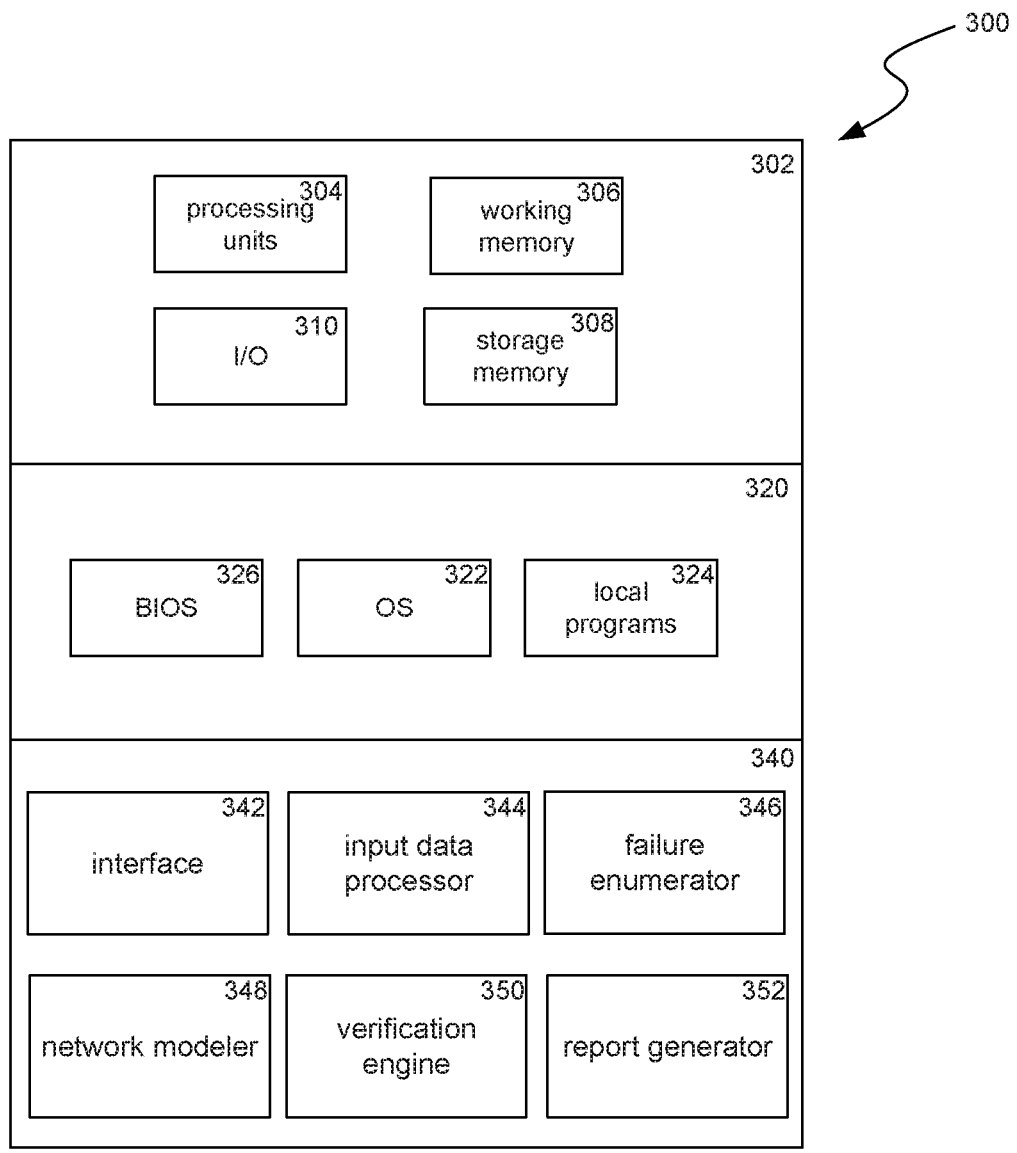
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include input data processor 344, failure enumerator 346, network modeler 348, verification engine 350, report generator 352, and components which can be used for transferring data and controlling the specialized components, such as interface 342. In some implementations, components 300 can be in a computing system that is distributed across multiple computing devices or can be an interface to a server-based application executing one or more of specialized components 340.

The input data processor 344 can be configured to receive and process input data, such as network information characterizing a backbone network. The network information includes data describing different aspects of a backbone network, such as which nodes are in the network, how the different nodes are connected to one another by links, reliability information pertaining to the nodes and links, and flows to be serviced by the network. The network information can, for example, be received from a user of the system wishing to evaluate how capacity should be added or allocated to the backbone network based on observed or projected network requirements and constraints. Once received, the input data processor can validate the input data to verify that the data is complete and consistent. For example, the input data processor can verify that each node is connected to at least one other node. As a further example, the input data processor can verify that the flow data does not refer to any nodes not defined by the network information. The input data can be formatted for use by the rest of the system. For example, the input data may be received in the form of a spreadsheet, a table, a text document of comma-separated values, or some other human-readable format utilized by network planners using the system, and formatted into an internal format for system use.

The failure enumerator 346 can be used to generate sets of failure scenarios for different classes of service. The failure enumerator determines the probabilities of single- and multi-link failure scenarios based on the reliability information for the corresponding links. That is, for example, as the mean time between failures of a link decreases, or as the mean time to repair for a link increases, the failure probability (e.g., the probability that, at any given time, the link is inoperable) of the link increases. Similarly, the failure probability of a multi-link failure scenario can be determined based on the failure probabilities of each of the individual link failures. After determining the failure probabilities of single- and multi-link failure scenarios, the failure enumerator selects failure scenarios for each class of service (e.g., one-nine availability requirement, two-nines availability requirement, three-nines availability requirement, etc.) of the flows to be evaluated by the system. For each class of service, the failure enumerator selects failure scenarios based on the failure probabilities of the scenarios and the availability requirement of the class of service. In an embodiment, as the availability requirement increases, the set of failure scenarios selected by the failure enumerator will increase. That is, for example, the class of service having five-nines availability (i.e., 99.999% availability) will typically correspond to a greater selected set of failures than the set selected for the class of service having one-nine availability (i.e., 90% availability). Failure scenarios selected for a class of service can be additionally based on a failure threshold that is adjusted for that failure scenario. That is, the system can adjust a failure threshold of a particular class of service such that the failure enumerator selects additional failure scenarios for that class of service.

The network modeler 348 can be configured to generate a model of a backbone network (e.g., an amount of capacity to be provisioned for the links forming the network) based on network information and the enumerated failures. The network modeler is configured to generate a model that satisfies certain constraints. The network model, and corresponding constraints, can be evaluated as a multi-commodity flow formulation with a given cost of links. For example, the network model may satisfy the constraint that each of the network flows described in the network information are to be satisfied (i.e., the network is able to provide network capacity meeting or exceeding the demand of that flow) at the required availability of the flow for a given set of failure scenarios. That is, as described further herein, the generated network model may ensure that the required availability of a flow is met for the selected set of failures corresponding to the class of service of the flow. The network modeler may not, however, ensure the required availability when additional failure scenarios are considered. The network modeler can additionally satisfy other constraints when generating the network model. For example, links can be associated with minimum or maximum capacity constraints. As a further example, nodes can be associated with minimum or maximum capacity constraints. As a still further example, flows can be associated with maximum delay constraints. As an additional example, nodes can be associated with flow conservation constraints. As a further example, the network modeler can be configured to minimize costs associated with the capacity provisioned from links in the network. The generation of a network model by the network modeler may be computationally expensive. Thus, as described herein, the network modeler uses a subset of failures that are identified to be of high importance (by, for example, the failure enumerator), and then subsequently verifies the model over a further set of scenarios.

The verification engine 350 can be used to evaluate a network model, such as one generated by the network modeler 348, and further verify that the model satisfies network constraints. For example, the verification engine can perform discrete evaluations of the network model, simulating a significant period of time (e.g., several thousand years), where at each discrete state the links of the network fail or are repaired according to the probabilities of those transitions. At each state, the verification engine determines which, if any, flows of the network are unsatisfied or unavailable (e.g., the network at the present state does not provide sufficient capacity to meet the demand of the flow). Once the simulation is complete (e.g., the network has generated a sufficient number of state transitions to cover the simulation window, and each of the states have been evaluated), the verification engine determines the total unavailability of each of the flows over the simulation window, and determines whether the unavailability of any of the flows exceeds the unavailability allowance for that flow (that is, whether any of the flows do not meet their required availability level). If any of the flows do not meet their required availability level, or do not meet any additional constraints evaluated at each discrete state, then the model verification fails and, as described herein, a new network model is generated (e.g., by the network modeler) using adjusted model parameters. If, however, all of the flows satisfy their required availability levels, and all other constraints are satisfied, then the model is treated as verified and forms the basis of a network plan. The network plan may then be used by a network planner to make network development decisions (e.g., where to allocate additional capacity). By performing discrete simulations representing a significant simulation timeframe (e.g., thousands of years), the verification engine is able to uncover a large set of potential network states, including those that are unlikely to occur, thereby facilitating a comprehensive verification of the generated network model.

The report generator 352 can be configured to generate reports based on the verified network model. For example, the reports can describe how capacity should be allocated or provisioned within the backbone network (i.e., the network plan). The generated reports can be both textual (e.g., tables) and graphical (e.g., graphs illustrating the paths utilized by different flows, graphs illustrating which links are used to satisfy the most flow demand, graphs illustrating which flows are susceptible to being unavailable for different failure scenarios, etc.). The reports may be used, for example, by network planners to determine how to effectively add capacity to or utilize capacity within a network to address forecasted flow demands.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Flows for a Network Planning with Guarantees System

Figure 4:
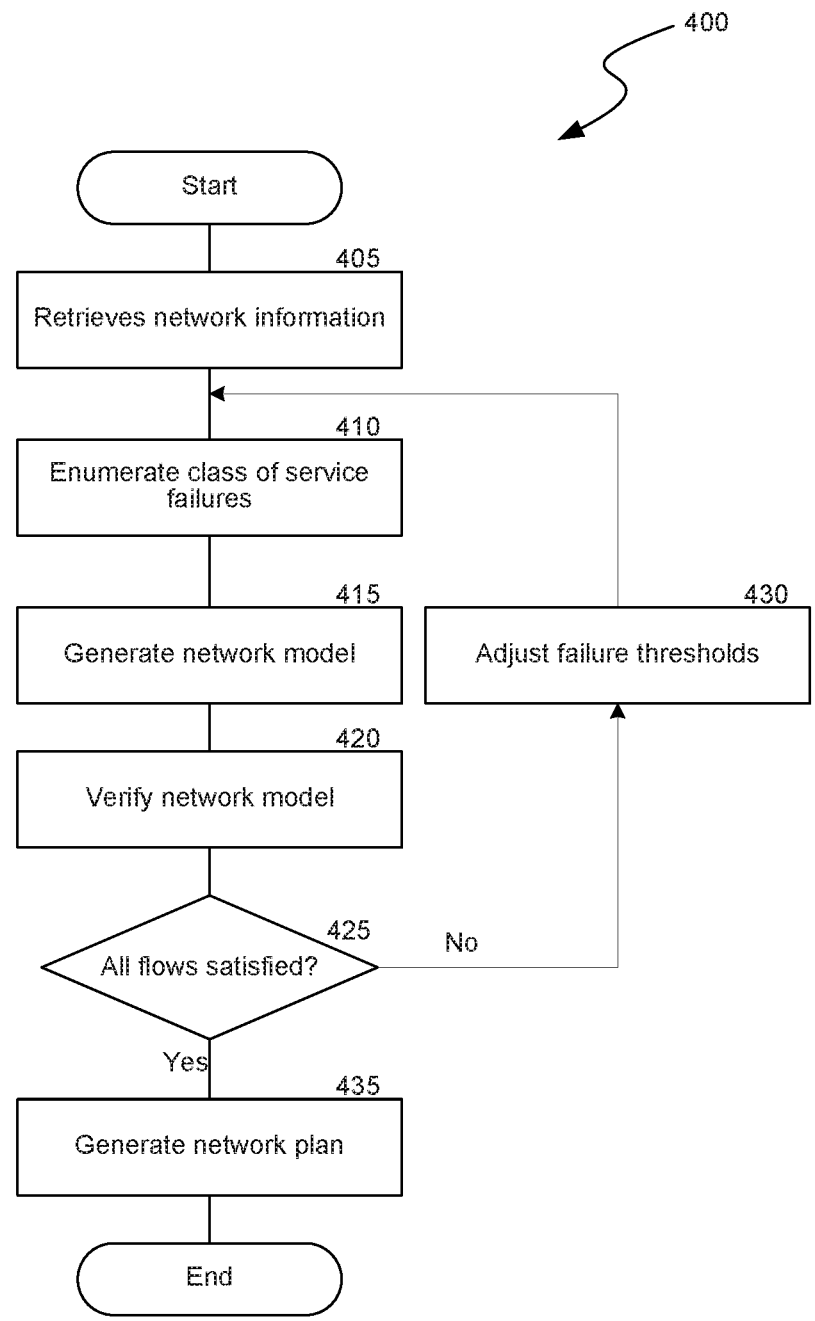
FIG. 4 is a flow diagram illustrating a process, used in some implementations of a network planning with guarantees system, for generating a network plan.

FIG. 4 is a flowchart illustrating an example process 400, implemented by the network planning with guarantees system, for generating a network plan. A network plan may be used by a network planner to guide the development of a backbone network, such as by indicating where capacity should be provisioned to best accommodate network needs.

At a block 405, the system retrieves network information characterizing a network to be modeled. The network information includes data describing the network (i.e., the nodes that form the network, the connectivity between the nodes), data describing the communication flows to be satisfied by the network (including, for example, the communication demands and the availability requirements of the flows), and reliability data characterizing the likelihood of failure or time to repair of the assets of the network. Aspects of the network information can be entered by a user of the network planning with guarantees system, retrieved from a file record of previously observed or forecasted data, obtained by contemporaneous observations of the operating conditions of the network, or other.

At a block 410, the system enumerates sets of failures for each of the required availability levels, or classes of service, of the flows described in the network information. As described herein, the system generates or identifies various failure scenarios (representing different combinations of single- or multi-link failures in the backbone network), and based on the probabilities of those failures, selects a set of those failures for each of the classes of service. The set of failures, which may be overlapping (i.e., a failure scenario may appear in the set corresponding to multiple classes of service), are selected based on their significance to the corresponding class of service. The operation of block 410 is described in greater detail with reference to FIG. 5.

At a block 415, the system generates a network model that satisfies various network constraints in view of network conditions as impacted by the enumerated sets of failures. That is, the system at block 415 may not consider all possible failures, but rather those that were selected at block 410. The operation of block 415 is described in greater detail below.

At a block 420, the system further verifies the generated network model. For example, the system can perform a discrete event simulation over a specified simulation timeframe, where at each discrete simulation step the network state reflects whether different network components are inoperative or operational. By using a sufficiently large simulation timeframe, the system is able to reach, and therefore evaluate, many different network states with different sets of operational and inoperative components. The network states may cover scenarios that differ from those considered when generating the network model at the block 415. When the simulation is complete, the system verifies whether various network constraints have been satisfied in aggregate. For example, the system can determine whether each flow is provided adequate network capacity for at least a threshold percentage of the simulation timeframe (i.e., whether, across the entire simulation timeframe, different network flows achieved their corresponding availability requirement). In some implementations, other network constraints can additionally be verified (for example, whether flow latency requirements were met). The operation of block 420 is described in greater detail with reference to FIG. 7.

At a decision block 425, the system determines whether all constraints have been satisfied for all flows. For example, the system determines whether each flow is satisfied by the network model at the required availability of the flow, based on the entire simulation timeframe. If all constraints have been satisfied, the process continues to a block 435, where the system generates a network plan based on the verified network model. If all constraints have not been satisfied, the system continues to a block 430.

At the block 430, the system adjusts failure thresholds for the classes of service corresponding to the flows that were not satisfied. That is, for example, if at decision block 425 the system determined a flow having a one-nine required availability was not available at least 90% of the simulation window, and a flow having a three-nines required availability was not available at least 99.9% of the simulation window, but that all flows have a two-nines required availability were available at least 99% of the simulation window, then the system would adjust the failure thresholds corresponding to the one-nine and three-nine classes of service. By adjusting the failure thresholds for those classes of service, the system will subsequently select additional failure scenarios for those classes of service. That is, continuing with the example above, the system would subsequently select additional failure scenarios for the one-nine and three-nine classes of service, but would select the same failure scenarios for the two-nine class of service as were selected previously. After adjusting failure scenarios, the process 400 returns to block 410 to enumerate failure scenarios for each of the classes of service of the flows.

Failure Enumeration in a Network Planning with Guarantees System

Figure 5:
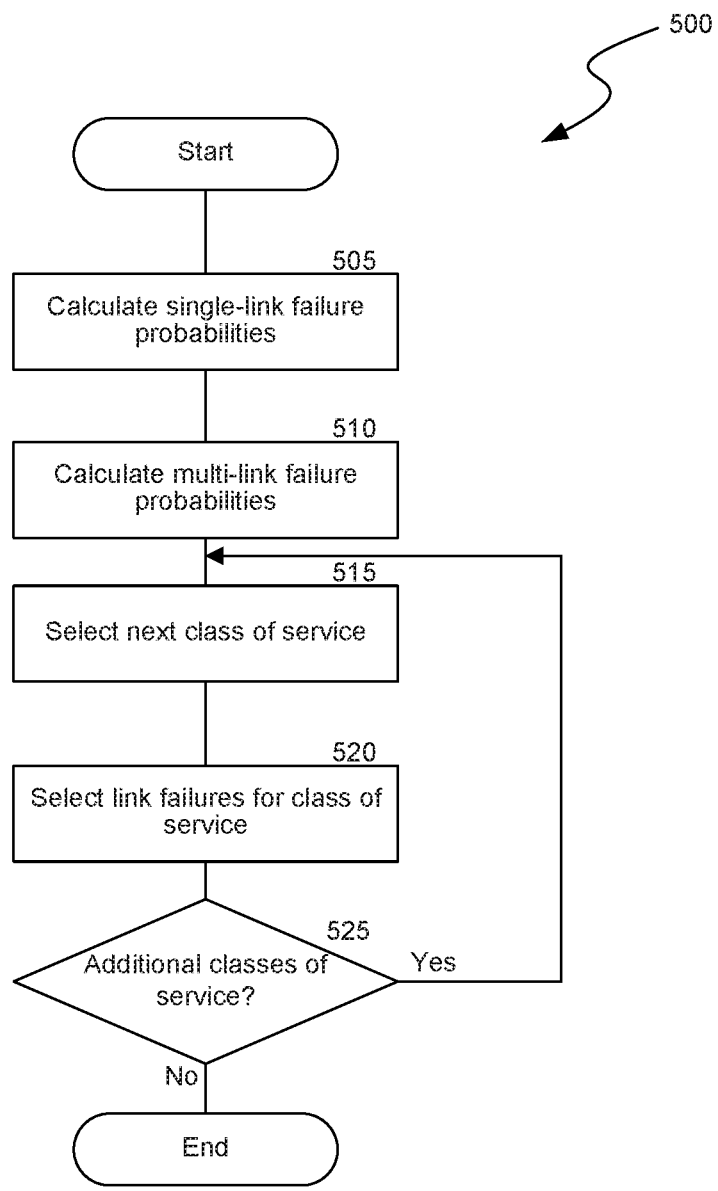
FIG. 5 is a flow diagram illustrating a process, used in some implementations of a network planning with guarantees system, for enumerating sets of failure scenarios.

FIG. 5 is a flowchart illustrating an example process 500, implemented by the network planning with guarantees system, for enumerating failure scenarios for different classes of service. The failure scenarios for a class of service, which typically are a subset of all failure scenarios, represent the most significant failure scenarios to that class of service and are therefore directly evaluated by the network modeler when generating a network model.

At a block 505, the system calculates the failure probabilities for single-link failure scenarios within the backbone network. That is the system determines, for each link in the backbone network, the probability that the link is inoperable at a given point of time. At this block the probability of failure of a link can be treated as independent of the probability of failure of any other link in the backbone network, and can be based on network information characterizing the reliability of the link. For example, the system can determine the failure probability of a link based on the mean time between failures and the mean time to repair of the link. Links with a larger mean time between failures would have a smaller failure probability (i.e., since a longer period of time is expected to elapse between failures, the probability that at any given time the link is inoperable will decrease). Links with a larger mean time to repair would have a larger failure probability (i.e., since it will take longer to repair the link once it has failed, the probability that at any given time the link is inoperable will increase). The reliability information for links can be based on observations of the backbone network (i.e., observations of how frequently a particular link fails and how long it takes to repair). The reliability information can additionally be based on projections. For example, in the absence of observed reliability information about a link, the reliability information of that link can be based on nearby or similarly-situated links. In some implementations, the single-link failure scenarios are sorted according to their corresponding failure probabilities to, for example, facilitate the selection of failure scenarios.

At a block 510, the system calculates the failure probability for multi-link failure scenarios with the backbone network. For example, the system can determine the probability of one or more 2-link failures, one or more 3-link failures, one or more 4-link failures, etc. The failure probability for each multi-link failure scenario can be based on the single-link failure probabilities of the corresponding links. For example, the probability of link failures in a multi-link failure can be treated as independent events (i.e., the occurrence of one link failure does not affect the probability of the other link failures), and the probability of the multi-link failure can thus be determined based on the product of the individual link failure probabilities. As a further example, the probability of link failures in a multi-link failure scenario can be treated as dependent events (for example, when the failure of a link is known to increase the failure probability of one or more additional links), and the failure probability of the multi-link failure can be adjusted accordingly. In some implementations, the system can generate different multi-link failure scenarios, which assume independence or dependence of the corresponding events based on, for example, configuration by a user of the system. In some implementations, the multi-link failure scenarios are sorted according to their corresponding failure probabilities to, for example, facilitate the selection of failure scenarios.

At a block 515, the system selects a next class of service, from the classes of service used by flows of the backbone network, for which failure scenarios will be selected. Each class of service corresponds to a required availability or uptime for the flow. For example, one class of service may have a requirement of 90% availability, another class of service may have a requirement of 99% availability, another class of service may have a requirement of 99.9% availability, etc.

At a block 520, the system selects failure scenarios for the selected class of service. Each class of service is associated with a particularly availability requirement (i.e., 90%, 99%, 99.9%, etc.). The system selects the failure scenarios for the class of service, from both the single-link and multi-link failure scenarios, based in part on the failure probabilities of the failure scenarios, the availability requirement of the class of service, and any failure thresholds for that class of service. The system can, for example, select all failures having a failure probability of at least 1−required availablity of class of service−failure threshold of class of service. For example, for a class of service having a 90% availability requirement, the system can select all failures having at least a 10% failure probability. If that same class of service also had an adjusted failure threshold of 3%, the system could select all failures having at least a 7% failure probability. As a further example, for a class of service having a 99% availability requirement, the system can select all failures having at least a 1% failure probability. That is, for classes of service with greater availability requirements, the system will select additional, and less likely to occur, single-link and multi-link failure scenarios. Similarly, the increased adjustments of the failure threshold associated with a class of service leads the system to select additional lower-probability failures for that class of service. As described herein, the failure threshold for a class of service can be adjusted to facilitate the selection of additional failures for a class of service based on, for example, the detection of flows that are not adequately satisfied by a model generated with a smaller set of failures.

At a decision block 525, the system determines if there are any additional classes of service for which failure scenarios are to be selected. If there are additional classes of service, the process returns to the block 515 so that the system can select the next class of service. Otherwise, the process 500 exits.

Figure 6:
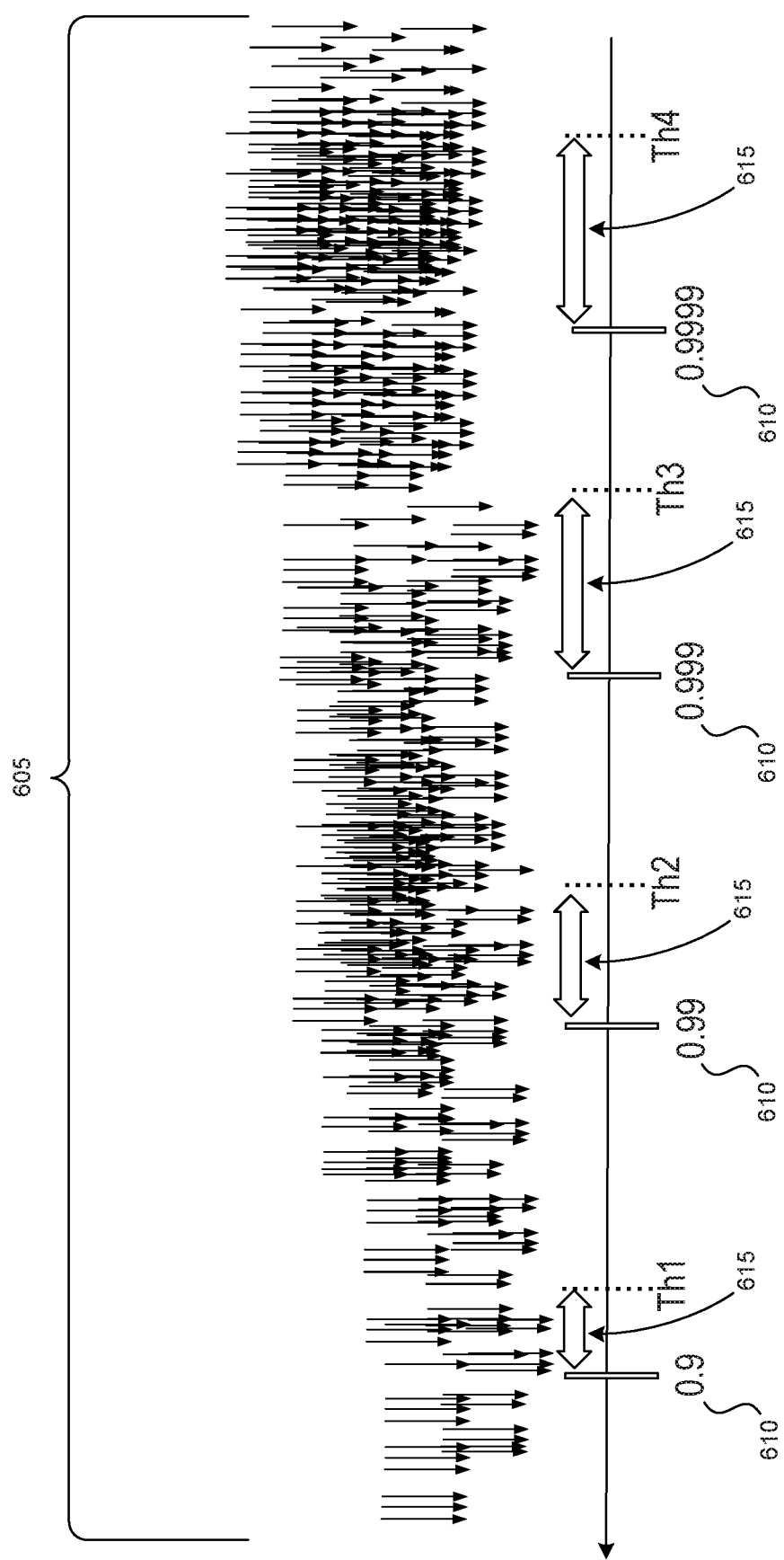
FIG. 6 illustrates an example representation of failure scenarios that may be selected for different required flow availabilities.

FIG. 6 illustrates an example representation of different failure scenarios and how the failure scenarios may be selected for different classes of service. Each failure scenario is represented by an arrow 605. For example, a first arrow may represent a single-link failure of a first link, a second arrow may represent a single-link failure of a second link, a third arrow may represent a multi-link failure of a third and a fourth link, etc. The placement of each arrow in FIG. 6 is based on the failure probability of the corresponding failure scenario. As illustrated in FIG. 6, the failure scenarios with the highest failure probability (i.e., the failure scenarios most likely to occur) begin at the left of the figure, with the lowest probability scenarios at the right of the figure. That is, the different failure scenarios are sorted based on their probability of occurring. In addition to the failure scenarios 605, FIG. 6 additionally illustrates baseline selection criteria 610 and adjustable failure thresholds 615 for different classes of service. Failure scenarios are selected by the system for a class of service if the failure scenario, as sorted according to the corresponding failure probability, is to the left of (e.g., more likely than) the baseline selection criteria as modified by the adjustable failure threshold of the class of service. As illustrated, for the four classes of service one-nine, two-nines, three-nines, and four-nines, the system can initially select failure scenarios to the left of (e.g., having a higher failure probability than) 0.9, 0.99, 0.999, and 0.9999, respectively. Through the operation of the system, the associated failure thresholds ("Th1," "Th2," "Th3," and "Th4") can be adjusted, thereby moving the point to the left of which failure scenarios are selected. That is, as illustrated, an adjustment to a class of service will cause the system to additionally select the failures to the right of the baseline selection criteria for a class of service but to the left of the adjusted point. Furthermore, the failure thresholds for different failure scenarios can be adjusted differently. That is, as illustrated, the failure threshold for the three-nines class of service can be adjusted more than the adjustment to the one-nines class of service failure threshold.

Network Modeling in a Network Planning with Guarantees System

As described herein, the system may model the backbone network as a multi-commodity max-flow formulation to generate a network model that satisfies particular constraints. For example, the modeler can provide a model of the network (i.e., an amount of capacity available at different components of the network) that satisfies network flows across the inputs evaluated by the modeler. The modeler can, for example, only consider limited sets of failure scenarios (such as may be enumerated for particular classes of service) instead of considering all failure scenarios. Details of a formulation used by the network modeler in an embodiment of the system are provided herein.

The modeler can represent the backbone network as a graph comprised of nodes N and links L, that must satisfy flows $\Omega$. Failures scenarios $\Lambda$, for each of the classes of service of the flows, are also evaluated.

Various constraints can be imposed on the model. For example, the model can be constrained such that no flow, over the set of failure scenarios associated with the class of service of the flow, exceeds its allowed unavailability. As an example, the constraint can be captured by the following requirement: $\Sigma_{\lambda \in \Lambda}\{(1-X(\omega, \lambda)) \times p_\lambda\} \leq \sigma_{cos(\omega)}$, where $X(\omega, \lambda)$ represents whether the flow $\omega$ is able to be routed under failure $\lambda$, $p_\lambda$ represents the probability of failure $\lambda$, and $\sigma_{cos(\omega)}$ represents the unavailability threshold for the class of service of flow $\omega$. In other words, the constraints require that for each of the flows $\omega$, the unavailability of that flow over the individual failure scenarios $\lambda$ for the class of service of that flow does not exceed the flow's unavailability threshold. In some implementations, other formulations of an unavailability constraint can be used.

Other constraints can be imposed on the model in addition to the unavailability constraint. For example, the model can be constrained by the maximum capacity per link, by the minimum capacity per link, by latency requirements for different flows, and by flow conservation at source, destination, and intermediate nodes.

Given the constraints, the objective of the model can be to optimize a combination of network costs, flow availabilities, and latencies observed by the flows under the set of failure scenarios associated with the flows. For example, the model can try to minimize the linear combination Network Cost−Availability+Latency. That is, an objective can be to (1) reduce network cost (where network cost is based on, for example, the amount of capacity provisioned from each network link, and can differ for different links), (2) increase flow availability, and (3) reduce latency. In some implementations of the system, each component of the linear combination can be weighted differently. In some implementations of the system, other formulations (i.e., non-linear combinations) of the same or different objectives can be used.

Generating a network model using the above-described techniques can computationally expensive. Thus, the system uses a subset of failure scenarios (i.e., significant failure scenarios for each class of service) and, as described below, further verifies the generated network model using additional discrete simulations.

Network Verification in a Network Planning with Guarantees System

Figure 7:
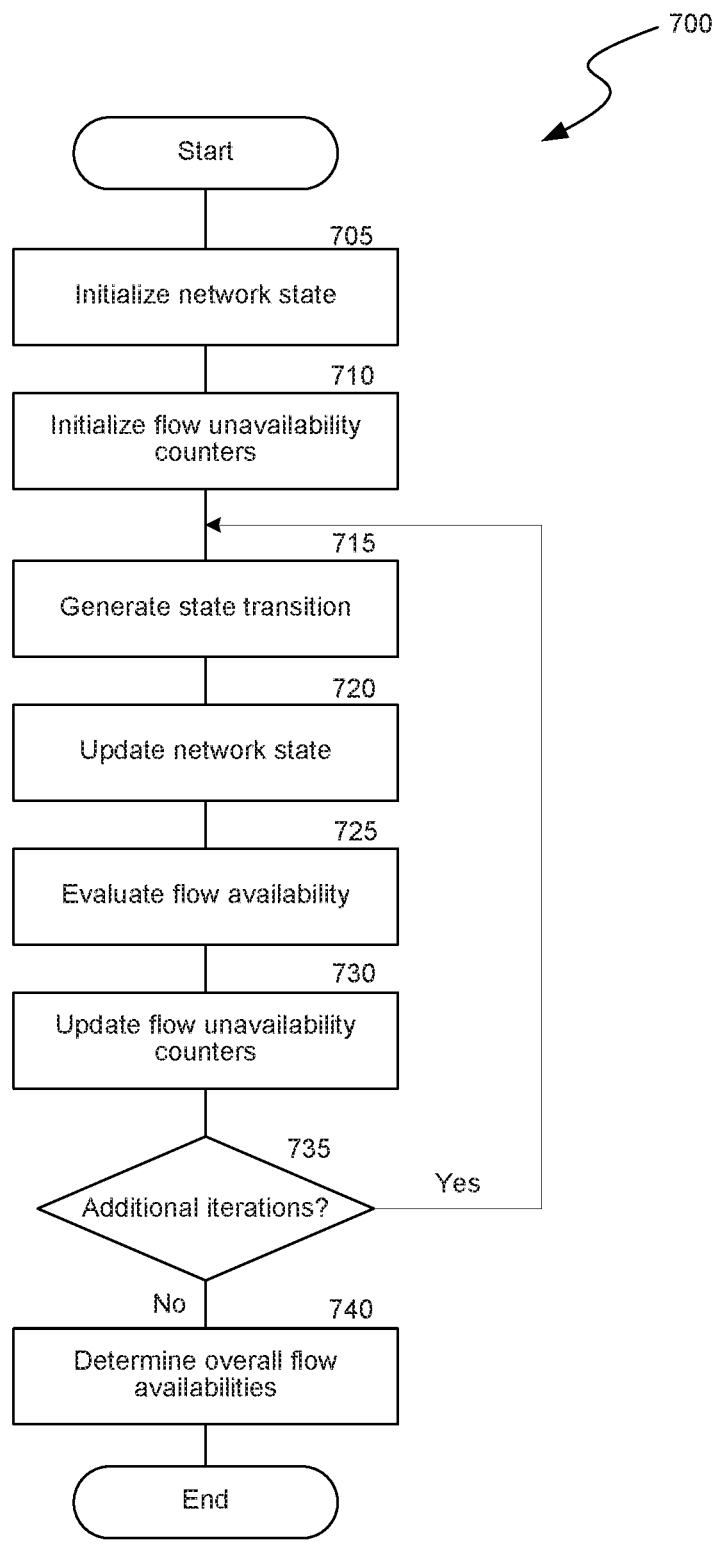
FIG. 7 is a flow diagram illustrating a process, used in some implementations of a network planning with guarantees system, for verifying a network model.

FIG. 7 is a flowchart illustrating an example process 700, implemented by the network planning with guarantees system, for performing discrete simulations to verify a generated network model. By performing discrete simulations over a significant simulation timeframe, the system is able to verify the network model over scenarios not captured by the network modeler.

At a block 705, the system initializes a network state to be used for simulation. For example, the network state can be initialized such that all links are treated as operational. Each of the assets, or links, of the network are further associated with an available or provisioned capacity as indicated by the network model.

At a block 710, the system initializes unavailability counters for each of the network flows. For example, each counter can be initialized to the value 0. The unavailability counters will be used to track instances in which each of the flows is unavailable during the simulation.

At a block 715, the system generates a state transition from the current network state. In an embodiment, a state transition consists of one of a transition of an inoperable link to an operable condition (i.e., a repair of a previously-failed link), or a transition of an operable link to an inoperable condition (i.e., a failure of a previously-working link). The probability of generating any transition can be based on the reliability data of the corresponding transitioning link.

At a block 720, the system updates the current network state to reflect the generated state transition.

At a block 725, the system evaluates the flow availabilities of each of the flows based on the current network state. That is, the system determines whether each of the flows can be satisfied (e.g., has available to it enough network capacity to satisfy the flow demand, can reach the flow destination from the flow source within flow latency requirements, etc.) based on the current network state of inoperable links. In some implementations an inoperable or failed link can be treated as being capable of carrying no network traffic, and therefore may contribute no capacity to the network in its current state.

At a block 730, the system updates unavailability counters for each of the flows that were determined to not be satisfied by the current network state. For example, the system can increment each of the corresponding counters. Flows can be rendered unsatisfied, and therefore corresponding counters updated, by not necessarily the most recently failed network link. That is, a link that has failed and transitioned to inoperable will continue to impact flows, and potentially contribute to the flows not being satisfied, for each evaluation until the link (or a sufficient number of other links) is repaired.

At a decision block 735, the system determines whether to perform additional simulation iterations. For example, each iteration (i.e., generating a state transition, updating the network state, and evaluating flow satisfiability) can represent a particular length of time (e.g., a day, a week, a month, a quarter, a year, etc.), and the system can be configured to perform a total simulation representing a particular overall timeframe (e.g., a year, a decade, one hundred years, a thousand years, etc.). The system therefore determines, based on the overall simulation timeframe and the epoch of each simulation iteration, whether to perform an additional iteration. If it is determined to perform an additional iteration, the process returns to block 715 to generate a new state transition. If it is determined not to perform an additional iteration, the process continues to a block 740.

At the block 740, the system determines the overall flow availabilities for each of the network flows. That is, the system determines the percentage of time, over the course of the simulation window, during which the flow was satisfied by the network in its various network states. The overall availability of a flow can be determined based on its unavailability counter. For example if, in a simulation of 100 iterations, the unavailability counter for a flow was 10 (i.e., at ten iterations the flow was not satisfied by the network in its then current network state), the flow would have an availability of 90%. As described herein, for example with reference to FIG. 4, the determined overall flow availabilities of each of the flows can then be evaluated to assess whether any flow's simulated availability did not meet the flow's required availability.

Figure 8:
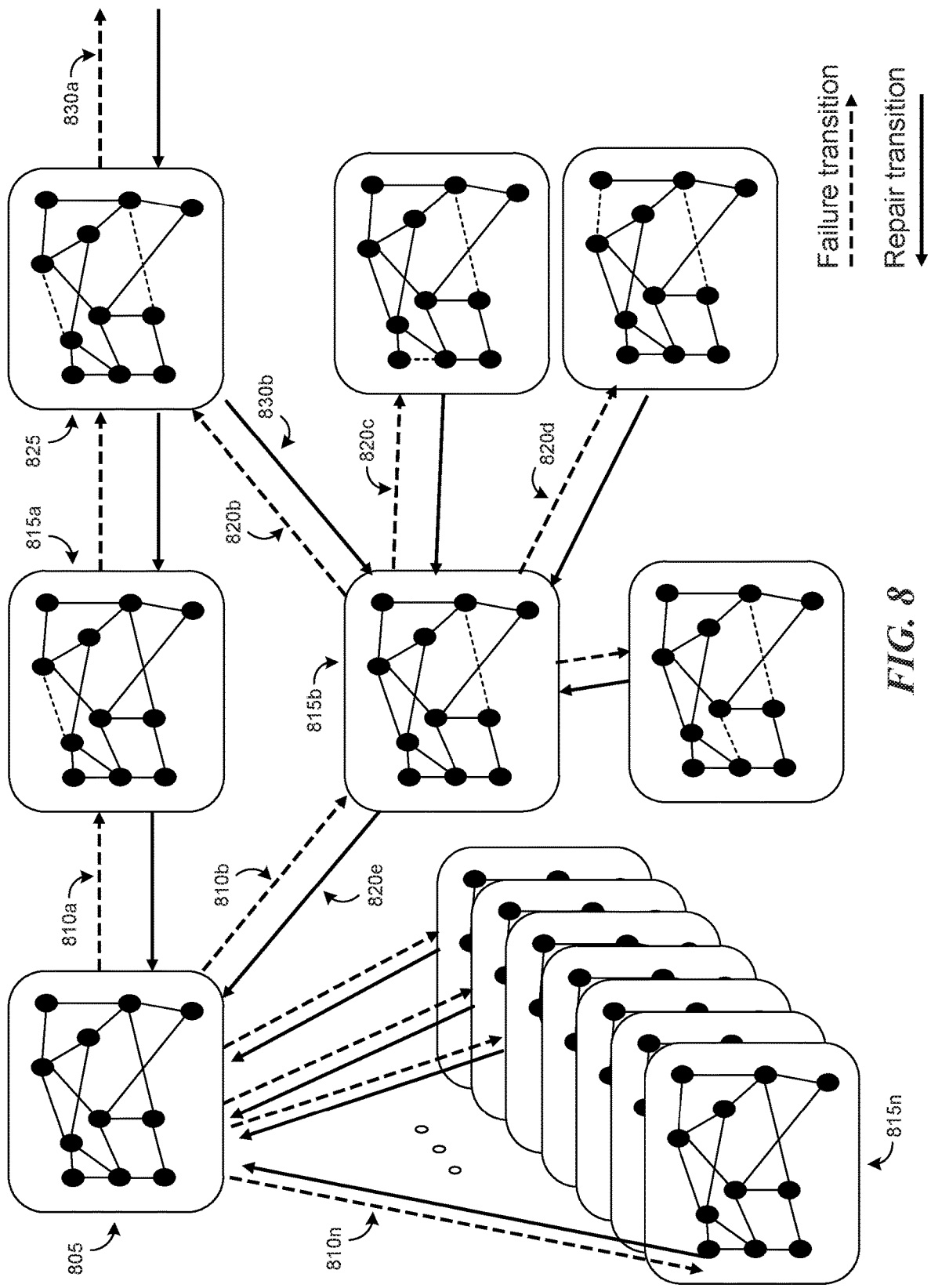
FIG. 8 is a conceptual diagram illustrating a representation of network states and state transitions, such as can be generated in some implementations of a network planning with guarantees system when verifying a network model.

FIG. 8 is a conceptual diagram illustrating a representation of different network states and state transitions that can be generated during discrete simulations of the network. Network state 805 represents an example initial network state. The state of the network is represented by a graph in which graph nodes represent nodes of the backbone network, graphs edges represent links of the backbone network, and edges are solid or dashed to reflect an operational or inoperative link, respectively. That is, as illustrated, in the initial network state 805, each link of the network is operational.

State transitions 810*a*, 810*b*, 810*c*, etc. through 810*n* represent different possible state transitions from the initial network state 805. Each transition 810*a*-810*n* represents a different potential change in the network (i.e., a failure or repair to a link). For example, there can be a transition 810 corresponding to each of the possible network changes from the initial network state. Since in the initial network state 805 each of the links are operational, all of the state transitions 810*a*-810 represent different scenarios in which a link fails (as represented by the dashed line). In embodiments in which the initial network state 805 includes inoperative links, some of the state transitions 810*a*-810*n* can include repairs to one of the inoperative links.

Network states 815*a*-815*n* represent different potential network states that can be transitioned to from the initial network state 805. As illustrated, each of the network states 815*a*-815*n* represents a network with a different failure scenario. For example, network state 815*a* represents a single-link failure to a particular link, network state 815*n* represents a single-link failure to a different link, etc.

State transitions 820 represent different potential network changes from network state 815*b*. For example, state transition 820*b* represents the failure of a first link (as illustrated by network state 825), state transition 820*c* represents the failure of a second link, and state transition 820*d* represents the failure of a third link. Furthermore, state transition 820*e* represents the repair (as designated by a solid line) of a link. In the illustrated example, since state 815*b* represents a state in which the network has a single link failure, and the state transition 820*e* represents the repair of that inoperative link, the transition causes the state to return to the initial network state 805 (i.e., all links are operational).

The state transitions from a network state can reflect all of the possible network changes from that network state. In some embodiments, a transition may only change one network link at a time (i.e., fail or repair on link). In some embodiments, a single transition can change more than one link (e.g., if a failure or repair to a link is known to influence another link). Selecting from a large selection of transitions when updating any given network state, and by performing many such network state updates, the system is able to generate network states that can exceed the coverage of enumerated network failure scenarios. That is, the use of discrete network states over a significant simulation timeframe facilitates the verification of a network model beyond what can be obtained with a network modeler.

Illustrations of Iterative Network Models

Figure 9:
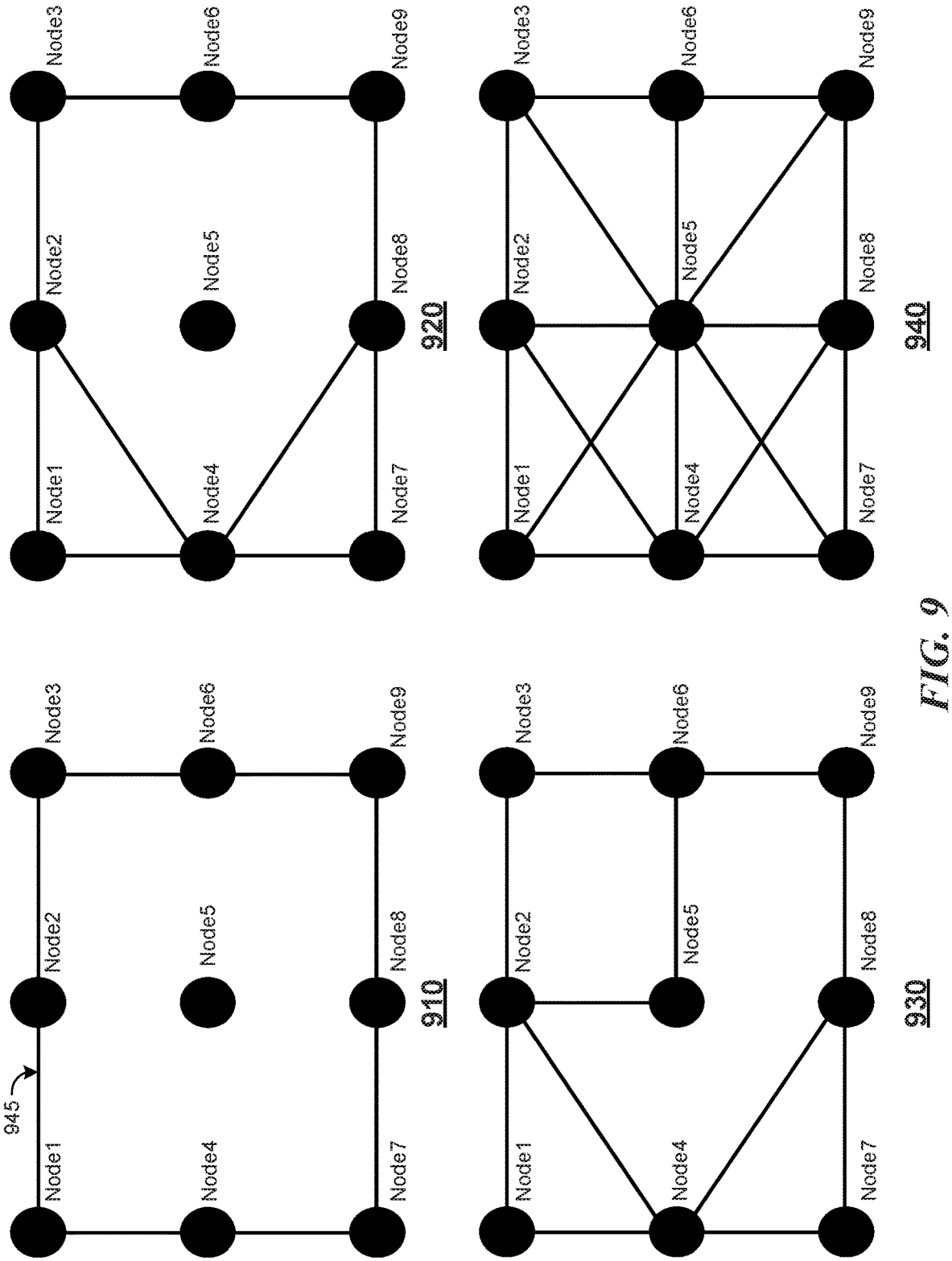
FIG. 9 is a conceptual diagram illustrating an example representation of network models, such as can be successively generated in some implementations of a network planning with guarantees system.

FIG. 9 is a conceptual diagram illustrating a representation of different network models that can be successively generated by the system. The system can generate a first network model, based on an initial set of failure scenarios to be considered by a network modeler, and can subsequently re-generate the network model based on expanded sets of failure scenarios when the first network model is not able to be verified. For purposes of illustration only, in the illustrated network models, links are either present or not present between two nodes; the amount of capacity in a present link cannot be increased. For example, network model 910 represents a first network model in which each perimeter node is connected to its two perimeter neighbors. In a second network model 920, which can be generated using an expanded set of enumerated failures after the network model 910 is not verified, the system can add links to connect "node 4" to both of "node 2" and "node 8." Similarly, by considering a further set of enumerated failures, the system can generate network model 930, which adds connectivity to "node 5." Finally, the system can generate network model 940. If the system determines that the network model 940 adequately satisfied network flows (based on, for example, performing a sufficient number of discrete event simulations), then the network model 940 represents the final network plan. That is, it represents how links should be added to the backbone network to satisfy demand flows while meeting other objectives (e.g., minimizing network cost).

Though FIG. 9 illustrates a simplified example in which links are either added or not added to a backbone network to satisfy network flows, in some embodiments the network models can be successively developed to additionally add or remove capacity to each of the links. By successively generating revised network models based on expanded sets of failure scenarios (where the sets are expanded only for those flows that previously failed), the system is thereby able to efficiently plan capacity for a network while satisfying different network needs (e.g., availability, latency, cost, etc.).

CONCLUSION

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method in a computing system, comprising:
    receiving, at the computing system, network data characterizing a backbone network, wherein the network data includes data representing a plurality of nodes, data representing a plurality of links of the backbone network, flow data characterizing a plurality of flows, and a link reliability, wherein each link is associated with a first node from the plurality of nodes, a second node from the plurality of nodes, and the link reliability, wherein the link reliability comprises a mean time between failure (MTBF) and a mean time to repair (MTTR) for the link, wherein the MTBF and the MTTR for the link are based on observed performance data associated with the link, and wherein each link of the plurality of links of the backbone network is associated with a cost-per-allocated-capacity, and wherein the cost-per-allocated-capacity is based on a cost of transmitting data over each link of the plurality of links of the backbone network;
    receiving, at the computing system, the flow data characterizing a plurality of flows, wherein each flow is associated with a third node from the plurality of nodes, a fourth node from the plurality of nodes, a flow demand, and an availability requirement level;
    enumerating, for each of the availability requirement levels associated with flows in the flow data, a corresponding plurality of link failures, the enumerating based on the availability requirement level and the link reliability of a plurality of links in the backbone network;
    generating, based on the enumerated link failures, the network data, and the flow data, a network model comprised of an allocated capacity for each link in the backbone network, wherein the flow demand and availability requirement level for each of the plurality of flows is satisfied by the network model for the plurality of the enumerated link failures corresponding to the availability requirement level of the flow;
    verifying whether the allocated capacities of the network model satisfy each of the flows from the plurality of flows characterized by the flow data; and
    generating, when the network model is verified, a network capacity plan.

2. The method of claim 1, further comprising
    identifying, when the network model is not verified, flows from the plurality of flows that are unsatisfied, wherein each unsatisfied flow is associated with a flow demand that is not satisfied by the network model at the availability requirement level of the unsatisfied flow;
    determining, for each unsatisfied flow, the availability requirement level of the unsatisfied flow;
    enumerating, for each of the availability requirement levels of the unsatisfied flows, a corresponding second plurality of link failures, wherein the corresponding second plurality of link failures comprises the plurality of link failures corresponding to the availability requirement level and at least one additional link failure; and
    generating, based on the second pluralities of link failures, a second network model comprised of an allocated capacity for each link in the backbone network.

3. The method of claim 2, wherein each availability requirement level is associated with a failure threshold, and wherein enumerating a second plurality of link failures corresponding to a particular availability requirement level comprises:
    adjusting the failure threshold associated with the particular availability requirement level of the unsatisfied flow; and
    selecting the at least one additional link failure based on the adjusted failure threshold.

4. The method of claim 2, further comprising:
    verifying whether the allocated capacities of the second network model satisfy each of the flows from the plurality of flows; and
    enumerating, when the second network model is not verified, a third plurality of link failures corresponding to a particular availability requirement level comprised of the second plurality of link failures corresponding to the particular availability requirement level and at least a second additional link failure.

5. The method of claim 1, wherein enumerating the link failures comprises, for each particular availability requirement level of the availability requirement levels associated with flows in the flow data:
    determining, based on the link reliability of each link, a failure probability of the link;
    generating a plurality of multi-link failures, wherein each multi-link failure characterizes a likelihood of failure of at least two links based on the failure probabilities of the at least two links;
    generating a plurality of failure scenarios, comprising the link and multi-link failures, wherein the failure scenarios are sorted based on the failure probabilities of the link failures and failure probabilities of the multi-link failures; and
    selecting for the particular availability requirement level, based on a probability associated with the particular availability requirement level and a threshold associated with the particular availability requirement level, link failures from the plurality of failure scenarios.

6. The method of claim 1:
    wherein the network model is generated based further on minimizing an overall network cost, and wherein the overall network cost is based on the cost-per-allocated-capacity and the allocated capacity of each link in the backbone network.

7. The method of claim 1, wherein each link of the plurality of links is additionally associated with a maximum capacity entitlement, and wherein the network model is generated based further on satisfying that no allocated capacity for a link exceeds the maximum capacity entitlement for the link.

8. The method of claim 1, wherein each flow of the plurality of flows is additionally associated with a maximum latency, each link is additionally associated with a delay, and wherein the network model is generated based further on, for each flow, the maximum latency of the flow not being exceeded by a total delay of the links satisfying the flow.

9. The method of claim 1, wherein each link of the plurality of links is additionally associated with a minimum capacity entitlement, and wherein the network model is generated based further on satisfying that the allocated capacity for each link exceeds the minimum capacity entitlement for the link.

10. The method of claim 1, further comprising
receiving, at the computing system, failure data or time to repair data for a link in the backbone network;
generating, based on the received failure data or time to repair data, the link reliability for the link;
enumerating, based on the generated link reliability, a second plurality of link failures; and
generating, based on the second plurality of link failures, a second network model comprised of an allocated capacity for at least one link in the backbone network.

11. The method of claim 1, wherein verifying whether the allocated capacities of the network model satisfy each of the flows from the plurality of flows characterized by the flow data comprises:
maintaining a network state comprised of indications of operational links from the plurality of links in the backbone network and inoperable links from the plurality of links in the backbone network;
maintaining, for each of the flows, an unavailability count;
for each of a number of iterations:
generating a state transition comprised of an inoperable link transitioning to operational or an operational link transitioning to inoperable, wherein the state transition depends on the link reliabilities of the links in the backbone network;
updating the network state based on the state transition;
evaluating, based on the updated network state, whether any of the flows are not satisfied by the network model in the updated network state; and
updating the unavailability counts for the flows not satisfied;
determining, for each of the flows, an unavailability measure based on the unavailability count of the flow and the number of iterations; and
verifying that the unavailability measure for each flow satisfies the availability requirement level of the flow.

12. The method of claim 1, wherein the availability requirement levels are 90% availability, 99% availability, 99.9% availability, 99.99% availability, or 99.999% availability.

13. A non-transitory computer-readable storage medium storing instructions that, when executed by a computing system, cause the computing system to perform operations comprising:
receiving, at a computing system, network data characterizing a backbone network, wherein the network data includes data representing a plurality of nodes, data representing a plurality of links of the backbone network, and flow data characterizing a plurality of flows;
receiving, at the computing system, the flow data characterizing a plurality of flows, wherein each flow is associated with a first node from the plurality of nodes, a second node from the plurality of nodes, a flow demand, and an availability requirement level, wherein the availability requirement level comprises a mean time between failure (MTBF) and a mean time to repair (MTTR) for the links, wherein the MTBF and the MTTR for the links are based on observed performance data associated with the links, and wherein each link of the plurality of links of the backbone network is associated with a cost-per-allocated-capacity, and wherein the cost-per-allocated-capacity is based on a cost of transmitting data over each link of the plurality of links of the backbone network;
enumerating, for each of a plurality of the availability requirement levels associated with flows in the flow data, a corresponding link failure, the enumerating based on the availability requirement level;
generating, based on the enumerated link failures, the network data, and the flow data, a network model comprised of an allocated capacity for each of a plurality of links in the backbone network, wherein the flow demand and availability requirement level for each of the plurality of flows is satisfied by the network model for the plurality of the enumerated link failures corresponding to the availability requirement level of the flow;
verifying whether the allocated capacities of the network model satisfy each of the flows from the plurality of flows characterized by the flow data; and
generating, when the network model is verified, a network capacity plan.

14. The non-transitory computer-readable storage medium of claim 13, further comprising
identifying, when the network model is not verified, a flow from the plurality of flows that is unsatisfied, wherein the unsatisfied flow is associated with a flow demand that is not satisfied by the network model at the availability requirement level of the unsatisfied flow;
enumerating, based on the identified unsatisfied flow, a plurality of link failures corresponding to the availability requirement level associated with the unsatisfied flow, wherein the plurality of link failures comprises the link failure corresponding to the availability requirement level associated with the unsatisfied flow and at least one additional link failure; and
generating, based on the plurality of link failures, a second network model.

15. The non-transitory computer-readable storage medium of claim 14, wherein the availability requirement level corresponding to the unsatisfied flow is associated with a failure threshold, and wherein enumerating the plurality of link failures corresponding to the availability requirement level of the unsatisfied flow comprises:
adjusting the failure threshold associated with the availability requirement level of the unsatisfied flow; and
selecting the at least one additional link failure based on the associated adjusted failure threshold.

16. The non-transitory computer-readable storage medium of claim 14, further comprising:

verifying whether the second network model satisfies each of the flows from the plurality of flows; and enumerating, when the second network model is not verified, a third plurality of link failures comprised of a second plurality of link failures and at least a second additional link failure.

17. A system comprising:

an input data processor configured to:

receive network data characterizing a backbone network, wherein the network data includes data representing a plurality of nodes and data representing a plurality of links of the backbone network, wherein each link of the plurality of links of the backbone network is associated with a cost-per-allocated-capacity, and wherein the cost-per-allocated-capacity is based on a cost of transmitting data over each link of the plurality of links of the backbone network; and receive flow data characterizing a plurality of flows, wherein each flow is associated with at least two nodes of the backbone network a flow demand, and an availability requirement level, wherein the availability requirement level comprises a mean time between failure (MTBF) and a mean time to repair (MTTR) for the link, wherein the MTBF and the MTTR for the link are based on observed performance data associated with the link;

a failure enumerator configured to:

enumerate, for each of a plurality of the availability requirement levels associated with flows in the flow data, a corresponding plurality of link failures;

a network modeler configured to:

generate, based on the enumerated plurality of link failures and the network data, a network model comprised of an allocated capacity for each of a plurality of links in the backbone network, wherein the flow demand and availability requirement level for each of the plurality of flows is satisfied by the network model for the plurality of the enumerated link failures corresponding to the availability requirement level of the flow; and a verification engine configured to:

verify whether the allocated capacities of the network model satisfy a particular flow from the plurality of flows characterized by the flow data.

18. The system of claim 17, wherein enumerating the link failures comprises, for each particular availability requirement level of the availability requirement levels associated with flows in the flow data:

determining, based on the link reliability of each link, a failure probability of the link;

generating a plurality of multi-link failures, wherein each multi-link failure characterizes a likelihood of failure of at least two links based on the failure probabilities of the at least two links;

generating a plurality of failure scenarios, comprising the link and multi-link failures, wherein the failure scenarios are sorted based on the failure probabilities of the link failures and failure probabilities of the multi-link failures; and selecting for the particular availability requirement level, based on a probability associated with the particular availability requirement level and a threshold associated with the particular availability requirement level, link failures from the plurality of failure scenarios.

* * * * *